(12) United States Patent
Asterjadhi et al.

(10) Patent No.: US 11,337,183 B2
(45) Date of Patent: May 17, 2022

(54) AGGREGATED CONTROL INFORMATION FOR A WIRELESS COMMUNICATION NETWORK

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Maarten Menzo Wentink, Nijmegen (NL); Padmanabhan Venkataraman Karthic, Tamil Nadu (IN)

(73) Assignee: QUALCOMM INCORPORATED, San Diego, CA (US)

( * ) Notice: Subject to any disclaimer, the term of this patent is extended or adjusted under 35 U.S.C. 154(b) by 140 days.

(21) Appl. No.: 16/803,579

(22) Filed: Feb. 27, 2020

(65) Prior Publication Data
US 2020/0280975 A1 Sep. 3, 2020

(30) Foreign Application Priority Data
Feb. 28, 2019 (IN) .............................. 201941007902

(51) Int. Cl.
*H04L 12/26* (2006.01)
*H04W 72/04* (2009.01)
*H04W 84/12* (2009.01)

(52) U.S. Cl.
CPC ........ *H04W 72/0406* (2013.01); *H04W 84/12* (2013.01)

(58) Field of Classification Search
CPC . H04W 72/0406; H04W 84/12; H04W 92/18; H04W 28/18; H04W 72/0413;
(Continued)

(56) References Cited

U.S. PATENT DOCUMENTS 10,812,634 B2 * 10/2020 Asterjadhi ............ H04L 5/0053
2009/0198761 A1 8/2009 Nanda et al.
(Continued)

FOREIGN PATENT DOCUMENTS

| EP | 2854468 | 4/2015 |
|---|---|---|
| WO | 2008008918 | 1/2008 |
| WO | 2016149292 | 9/2016 |

OTHER PUBLICATIONS

"PCT Application No. PCT/US2020/020276 International Search Report and Written Opinion", dated May 21, 2020, 13 pages.

*Primary Examiner* — Nguyen H Ngo
(74) *Attorney, Agent, or Firm* — DeLizio Law, PLLC

(57) ABSTRACT

This disclosure provides systems, methods, and apparatus, including computer programs encoded on computer-readable media, for signaling aggregated control information in a wireless communication network. A frame format may include an aggregated control (A-Control) field. In one aspect, the A-Control field may be variable-length to support signaling multiple types of control information. In some implementations, an access point may manage multiple links (multi-link). The A-Control field may be structured to include multi-link control information. This disclosure includes multiple options for extending an A-Control field. Furthermore, a receiving device may acknowledge the A-Control field using various techniques disclosed herein.

25 Claims, 13 Drawing Sheets

(58) Field of Classification Search
CPC . H04W 72/04; H04W 72/0453; H04W 28/06; H04W 72/042; H04W 72/044; H04W 72/0446; H04W 76/15; H04W 28/065; H04W 74/022; H04L 5/0053; H04L 5/0055
USPC ....... 370/229, 230, 252, 328, 329, 330, 473, 370/474, 476, 496, 522
See application file for complete search history.

(56) References Cited

U.S. PATENT DOCUMENTS

| | | |
|---|---|---|
| 2014/0194112 A1 | 7/2014 | Ngo |
| 2016/0262050 A1* | 9/2016 | Merlin ................. H04L 5/0048 |
| 2016/0366254 A1* | 12/2016 | Asterjadhi ............ H04L 5/0053 |
| 2017/0034284 A1 | 2/2017 | Smith et al. |
| 2017/0070914 A1* | 3/2017 | Chun .................... H04L 5/0053 |
| 2017/0127385 A1* | 5/2017 | Vermani .............. H04B 7/0643 |
| 2017/0294992 A1* | 10/2017 | Chu ...................... H04W 84/12 |
| 2017/0367090 A1* | 12/2017 | Lim ........................ H04L 5/001 |
| 2018/0041917 A1* | 2/2018 | Xi ......................... H04W 28/04 |
| 2018/0324840 A1* | 11/2018 | Kim ........................ H04L 1/00 |
| 2019/0021091 A1* | 1/2019 | Ko ...................... H04W 74/002 |
| 2020/0120603 A1* | 4/2020 | Seok ................ H04W 52/0222 |

\* cited by examiner

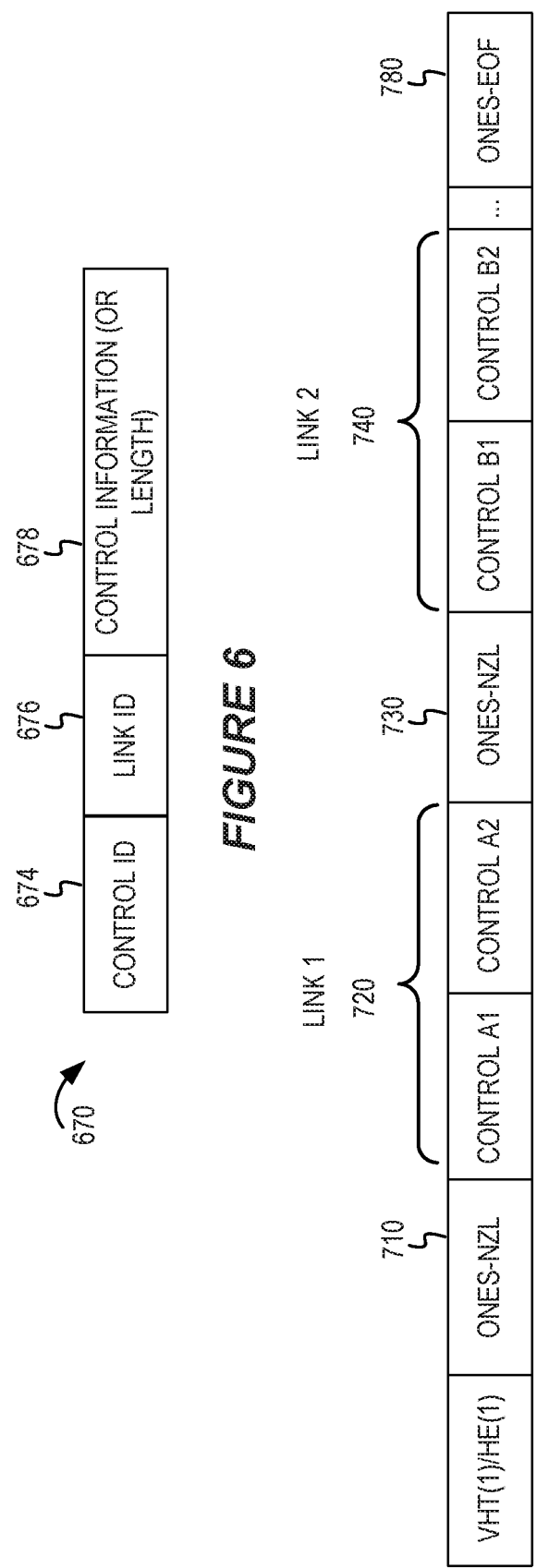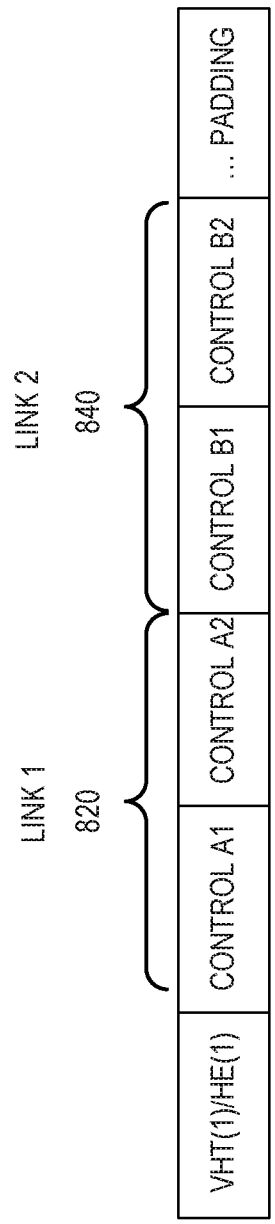

AGGREGATED CONTROL INFORMATION FOR A WIRELESS COMMUNICATION NETWORK

CROSS-REFERENCE TO RELATED APPLICATIONS

This patent application claims priority to Indian Provisional Patent Application No. 201941007902, filed Feb. 28, 2019, entitled "AGGREGATED CONTROL INFORMATION FOR A WIRELESS COMMUNICATION NETWORK," and assigned to the assignee hereof. The disclosure of the prior application is considered part of and is incorporated by reference in this patent application.

TECHNICAL FIELD

This disclosure relates to the field of wireless communication, and more specifically, to aggregated control information in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices, also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain one or more communication links with the WLAN.

Devices in a WLAN may share control information to maintain or share status. As communication protocols for WLANs have evolved, there has been an effort to maintain backward compatibility. Therefore, existing techniques for sharing control information may be constrained by earlier versions of a communication protocol. Meanwhile, more control information may be useful in some WLAN deployments.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a first wireless local area network (WLAN) device for wireless communication. The method may include determining a plurality of control parameters for transmission from a first wireless communication device to a second wireless communication device. Each control parameter may include at least a Control identifier (ID) and a control value. The method may include generating a first frame for transmission via a first wireless link. The first frame may include an aggregated control (A-Control) field formatted with the plurality of control parameters. The method may include outputting the first frame for transmission from the first wireless communication device to the second wireless communication device.

In some implementations, the A-Control field may be a variable-length control field.

In some implementations, a length of the A-Control field may be determined based on a negotiation between first wireless communication device and the second wireless communication device. The negotiation may occur either during or after a wireless association and before outputting the first frame In some implementations, the method may include determining a length of the A-Control field based, at least in part, on the plurality of control parameters. The method may include populating a first portion of the A-Control field with an indication based on the length.

In some implementations, the first portion may be formatted as a first control parameter, the first control parameter having a reserved value for the Control ID and having the length as the control value for the first control parameter.

In some implementations, the reserved value may include a series of binary ones.

In some implementations, the first frame may have a frame format of a control frame.

In some implementations, the first frame may be first media access control (MAC) protocol data unit (MPDU).

In some implementations, the first MPDU may be included in an aggregated MPDU (A-MPDU) transmission.

In some implementations, an MPDU delimiter in the A-MPDU transmission may include an indicator to indicate that the first MPDU includes the A-Control field and that the A-Control field is a variable-length A-Control field.

In some implementations, the first MPDU may only contain the variable-length A-Control field. The indicator may be included in a length field of the MDPU delimiter. The indicator may have a value that is less than a smallest length of an MPDU according to a technical standard, such that the value is reserved to repurpose the length field for indicating the presence of the variable-length A-Control field in the first MPDU.

In some implementations, the plurality of control parameters may include a first subset of control parameters related to the first wireless link and a second subset of control parameters related to a second wireless link managed by the first wireless communication device.

In some implementations, the A-Control field may include the first subset of control parameters and the second subset of control parameters, and the A-Control field may be a multi-link control field.

In some implementations, the method may include generating a second frame for transmission via the second wireless link. The second frame includes a redundant copy of the A-Control field formatted with the plurality of control parameters. The method may include outputting the second frame for transmission from the first wireless communication device to the second wireless communication device via the second wireless link.

In some implementations, the plurality of control parameters may include at least one control parameter to enable or disable at least one of the first wireless link or the second wireless link.

In some implementations, the plurality of control parameters may include timing information related when to enable or disable the first wireless link or the second wireless link.

In some implementations, the timing information may include a time offset relative to a start or end of the first frame.

In some implementations, the timing information may include a time value based on a timer synchronized between the first wireless communication device and the second wireless communication device.

In some implementations, the timer may be synchronized for the first wireless link, the second wireless link, or both the first and second wireless links.

In some implementations, the A-Control field may include a delimiter between the first subset of control parameters and the second subset of control parameters.

In some implementations, the delimiter may be formatted as a first control parameter. The first control parameter may have a reserved value for the Control ID and having a null control value.

In some implementations, the method may include receiving an acknowledgment from the second wireless communication device. The acknowledgment may indicate that the A-Control field was successfully processed by the second wireless communication device.

In some implementations, the acknowledgment may be different from a media access control (MAC) acknowledgment for acknowledging the first frame.

In some implementations, the acknowledgment may be included in a reserved bit of a frame control field or block acknowledgment control field.

In some implementations, the acknowledgement may include signaling to indicate that the acknowledgment is for the plurality of control parameters.

In some implementations, the acknowledgment may be included in a multi-station block acknowledgment (multi-STA Block Ack) message.

In some implementations, the signaling may include predefined values for an acknowledgment type field and a traffic identifier field of the multi-STA Block Ack message.

In some implementations, the first frame may include the A-Control field in a payload portion of a null packet, a quality-of-service (QoS) Null frame, or a null data packet (NDP).

Another innovative aspect of the subject matter described in this disclosure can be implemented as a computer-readable medium having stored therein instructions which, when executed by a processor, causes the processor to perform any one of the above methods.

Another innovative aspect of the subject matter described in this disclosure can be implemented as an apparatus having an interface for communicating via a wireless local area network and a processor. The processor may be configured to perform any one of the above methods.

Another innovative aspect of the subject matter described in this disclosure can be implemented as system including means for implementing any one of the above methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an example of explicit indicators for multi-link aggregated control parameters.

FIG. 7 shows another example of an A-Control field with control parameters for multiple links.

FIG. 8 shows an example of an A-Control field with control parameters for multiple links without using delimiters.

Like reference numbers and designations in the various drawings indicate like elements.

DETAILED DESCRIPTION

Figure 1:
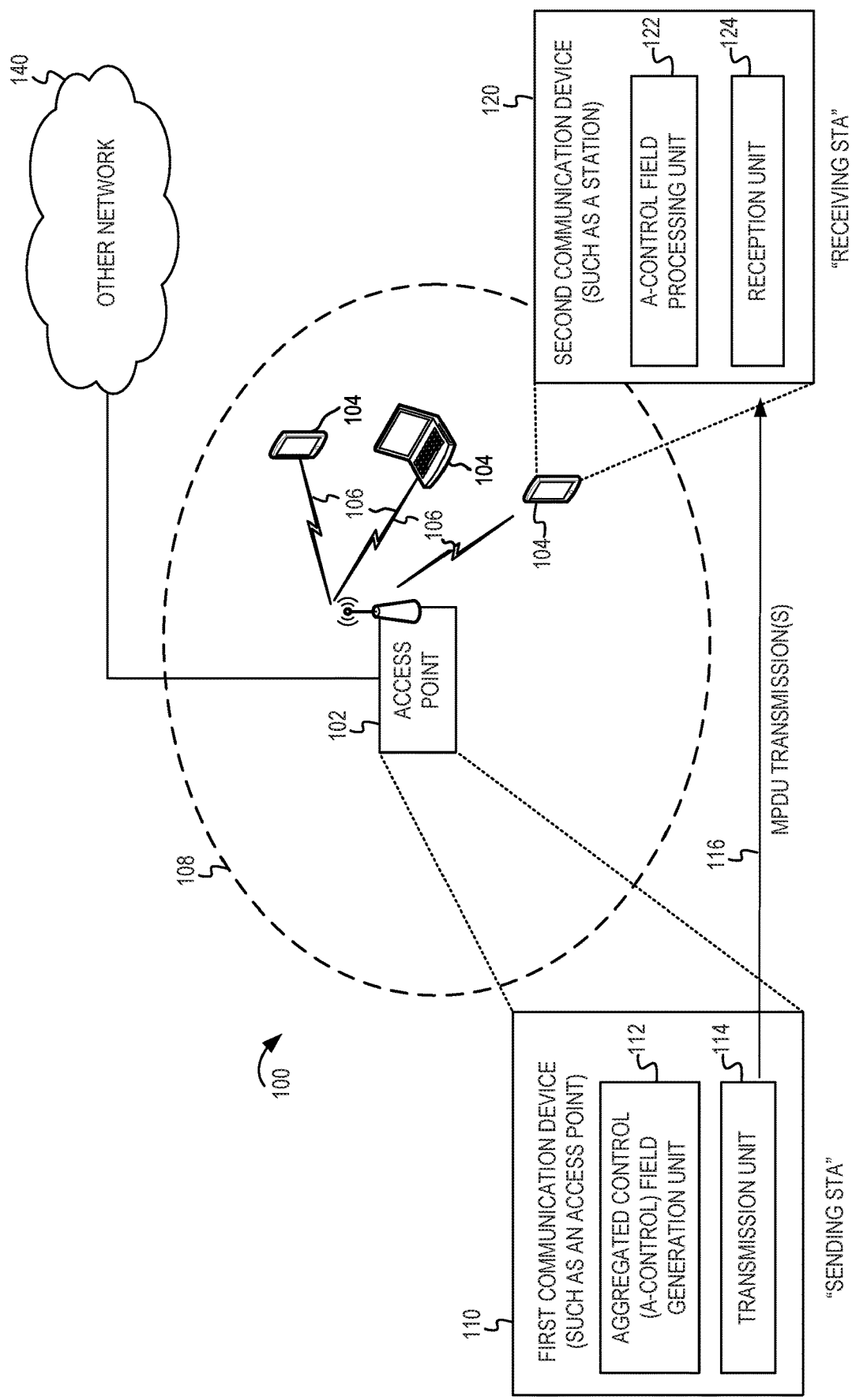
FIG. 1 depicts a system diagram of an example wireless local area network (WLAN) for introducing concepts of this disclosure.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other areas may include one or more WLAN devices. Each WLAN device may have a station (STA) interface which is an addressable entity that shares a wireless communication medium with other STAs. An access point (AP) is a WLAN device that includes a STA interface as well as a distribution system access function. For brevity in this disclosure, WLAN devices may be referred to as STAs, regardless of whether the WLAN device is an AP or a non-AP STA. A first wireless communication device (acting as a sending STA) may communicate data to a second wireless communication device (acting as a receiving STA) via a wireless channel. A technical standard may define formats for communications. For example, the first wireless communication device may prepare and transmit a media access control (MAC) protocol data unit (MPDU) according to a standardized format. An MPDU also may be referred to as a frame or a packet in some aspects of this disclosure. A physical convergence layer (PHY) protocol data unit (PPDU) may include one or more MPDUs. For example, one type of PPDU (referred to as an Aggregated MPDU, or A-MPDU) may include multiple MPDUs in a payload of the AMPDU.

In legacy technical standards, control information may be structured according to a fixed length field and defined bit locations for different control parameters. More recently, the quantity and type of control parameters has increased, making legacy control formats insufficient. Furthermore, the fixed length of legacy control formats limits the type and quantity of control parameters that can be included in a frame. To provide some greater flexibility, an aggregated control (A-Control) field may include multiple control parameters. Each control parameter (sometimes also referred to as a control field or a control subfield) may include a control identifier (Control ID) and a control value.

In accordance with this disclosure, an A-Control field may be a Dynamic A-Control field (also referred to as an Enhanced A-Control field). For example, the A-Control field may be a variable-length field in an MPDU. In some implementations, the length of the A-Control field may be negotiated between two wireless communication devices, such as at time of wireless association. In some implementations, a first portion of the A-Control field may indicate the length of the A-Control field. For example, the first portion may be formatted as a control header (sometimes also referred to as a control delimiter or delimiter). The control header may have a format mimicking a control parameter within the A-Control field. For example, the control header may be structured similarly to the control parameters and may have a specific value (such as a series of binary ones) for the Control ID. The specific value indicates that the control header is a type of control parameter that contains the length of the A-Control field. The control header may be included as the first control parameter of the A-Control field to indicate the length of the A-Control field. Alternatively, the control header may be located at any location within the A-Control field and can indicate either the length of the full A-Control field or of the remaining portion (following the control header) of the A-Control field. Thus, the A-Control field may be variable-length to support signaling multiple types of control information. For example, the length of the A-Control field may vary between 4 bytes (baseline) and 64 bytes (as an example maximum). The length of the A-Control field may be indicated by a length value and the length value may represent groups of octets (such as 1, 2, or 4 octets for each integer length value).

In some implementations, the specific control ID may be all ones (in which case, assuming the control ID is 4 bits long, the all-ones binary value would have a decimal value of 15). Although the all-ones example is used in this disclosure, the specific value may be any value that is supported by the recipient and that is not used as a control ID for other purposes. Following the specific control ID, the control information in the control header may indicate the length value as either a zero-length value, a non-zero value, or an all-ones length value. For example, a control parameter referred to as "ONES-NZL" (all ones for Control ID followed by a non-zero length value less than a maximum value) may indicate that the A-Control field is a variable-length A-Control field having a length indicated by the non-zero length value. In some implementations, a control parameter referred to as a "ONES-EOF" (all ones for Control ID followed by all ones for the value) may indicate an end of the A-Control field. A control parameter referred to as "ONES-ZL" (all ones for Control ID followed by a zero-length value) may be used as a delimiter between different subsets of the control parameters included in the A-Control field.

In some implementations, a device may operate simultaneously or at different times with multiple links (multi-link, multi-channel, or multi-bands). The A-Control field may be structured to include multi-link control information. For example, the A-Control field may include a first subset of control parameters for a first wireless link and a second subset of control parameters for a second wireless link. For example, the A-Control field may include signaling for indicating control information that governs or helps the functionality of a link. As an example, the signaling may include signaling for dynamic enabling or disabling each of the wireless links.

This disclosure includes a variety of techniques for signaling multi-link control information. For example, each of the links may be identified using explicit signaling or implicitly based on one or more of the structure of the A-Control field, certain bit settings in frames that carry the A-Control field, or the link (such as the channel or band) at which the frame is exchanged. Therefore, the identifier of the link of interest may be determined from the A-Control field or the frame that carries the A-Control field. For example, a link may be identified by certain bits preceding each set of Control parameters. In another example, the link may be identified by certain bits contained in the frame that carries the A-Control field. In some implementations, the A-Control field may contain a link identifier or delimiter to signal the beginning or end of a subset of control parameters for each link. In some implementations, the MPDU may be a Management frame containing an information element (IE) identifying the link of interest. In some implementations, the link identifier may be contained in the QoS Control field or any other field of the MAC header that precedes the field containing the A-Control field. For example, the most significant bit (MSB) of the traffic indicator (TID) field of the QoS Control field is currently reserved and set to 0. In some implementations, the setting of the MSB of the TID field to 1 may be used to indicate that the control information being provided by the A-Control field that follows in the same MPDU is relative to the secondary link (different from the primary link on which the MPDU is being sent). The primary link is the link where the frame is being sent, and the secondary link is the link where the frame is not being sent. Using just one bit (such as the MSB of the TID field), the transmitting device may distinguish up to two links. The transmitting device may include MPDUs with different values of the MSB bit of the TID of the QoS Control if it wants to signal different control information for the two different links. For example, a first MPDU (with the MSB of the TID set to 0) may include an A-Control field with aggregated control information for the primary link. A second MPDU (with the MSB of the TID set to 1) may include an A-Control field with control information for the secondary link.

In some implementations, the ONES-NZL may be the first control parameter in the A-Control field and may indicate an overall length of the Dynamic A-Control (with control parameters for multiple links). After a first subset of control parameters (such as for the first wireless link), a delimiter may indicate whether control parameters for the next link is included. If no control information is available for the link, then a ONES-ZL may be used. Alternatively, the ONES-ZL may precede the control information for each of the additional links. In some implementations, a ONES-EOF or Padding can be used to populate a remaining portion of the Dynamic A-Control field.

The A-Control field described in this disclosure may be included in any type of frame, including a management frame, a data frame, or a control frame. The A-Control field also may be included in a PPDU that does not contain a Data field. For example, the A-Control field may be included as a field of the PHY header of the PPDU without having a data field. In some implementations, the A-Control field may be included in an MPDU that is part of an A-MPDU with multiple frames. In some implementations, the A-Control field may be included in a payload of a null frame (such as a quality-of-service, QoS, Null frame or a null data packet (NDP)).

Particular implementations of the subject matter described in this disclosure can be implemented to realize one or more of the following potential advantages. An A-Control field may be a variable-length to support the growing quantity of control parameters that may be signaled. Furthermore, an A-Control field may be used to include control parameters for multiple links. Multi-link communication presents an opportunity for APs and STAs to coexist concurrently on multiple channels that can be enabled or disabled as needed (based on bandwidth need or to avoid interference with other systems, reduce power consumption by selectively turning off links that are not in use, providing fast feedback for different links via other links to quickly adapt to the medium conditions or systems requirements, or the like.

FIG. 1 depicts a system diagram of an example WLAN for introducing concepts of this disclosure. FIG. 1 includes a block diagram of an example wireless communication network 100. According to some aspects, the wireless communication network 100 can be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof). The WLAN 100 may include numerous wireless communication devices such as an AP 102 and multiple STAs 104 having wireless associations with the AP 102. The IEEE 802.11-2016 specification defines a STA as an addressable unit. An AP is an entity that contains at least one STA and provides access via a wireless medium (WM) for associated STAs to access a distribution service (such as another network 140). Thus, an AP includes a STA and a distribution system access function (DSAF). In the example of FIG. 1, the AP 102 may be connected to a gateway device (not shown), which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), wearable devices, music or other audio or stereo devices, remote control devices ("remotes"), printers, kitchen or other household appliances, key fobs (for example, for passive keyless entry and start (PKES) systems), among other possibilities.

The AP 102 and the associated STAs 104 may be referred to as a basic service set (BSS), which is managed by the AP 102. A BSS refers to one STA (such as an AP) that has established service settings and one or more STAs that have successfully synchronized the service settings. Alternatively, a BSS may describe a set of STAs that has synchronized matching mesh service profiles. Using the example architecture in FIG. 1, the BSS may be identified by a service set identifier (SSID) that is advertised by the AP 102. The AP 102 may periodically broadcast beacon frames ("beacons") to enable any STAs 104 within wireless range of the AP 102 to establish or maintain a respective communication link 106 (also referred to as a "Wi-Fi link" or "wireless association") with the AP. An "unassociated STA" (not shown) may not be considered part of the BSS because they do not have a wireless session established at the AP 102. The various STAs 104 in the WLAN may be able to communicate with external networks as well as with one another via the AP 102 and respective communication links 106. To establish a communication link 106 with an AP 102, each of the STAs is configured to perform passive or active scanning operations ("scans") on frequency channels in one or more frequency bands (for example, the 2.4 GHz, 5 GHz, 6 GHz or 60 GHz bands). To perform passive scanning, a STA listens for beacons, which are transmitted by respective APs 102 at a periodic time interval referred to as the target beacon transmission time (TBTT) (measured in time units (TUs) where one TU is equal to 1024 microseconds (s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link with the selected AP.

FIG. 1 additionally shows an example coverage area 108 of the AP 102, which may represent a basic service area (BSA) of the WLAN 100. While one AP 102 is shown in FIG. 1, the WLAN 100 can include multiple APs 102. As a result of the increasing ubiquity of wireless networks, a STA 104 may have the opportunity to select one of many BSSs within range of the STA 104 or select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at various times for different transmissions. Additionally, after association with an AP 102, a STA 104 also may be configured to periodically scan its surroundings to find a more suitable AP with which to associate. For example, a STA 104 that is moving relative to its associated AP 102 may perform a "roaming" scan to find another AP having more desirable network characteristics such as a greater received signal strength indicator (RSSI).

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ay, 802.11ax, 802.11be (802.11-EHT), 802.11az, and 802.11ba). These standards define the WLAN radio and baseband protocols for the physical (PHY) and medium access control (MAC) layers. The APs 102 and STAs 104 transmit and receive frames (hereinafter also referred to as wireless communications") to and from one another in the form of physical layer convergence protocol (PLCP) protocol data units (PPDUs. Each PPDU is a composite frame that includes a PLCP preamble and header as well as one or more MAC protocol data units (MPDUs).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax, and 802.11-extreme high throughput (EHT) standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs conforming to the IEEE 802.11n, 802.11ac, 802.11ax, and 802.11be (802.11-EHT) standard amendments may be transmitted over physical channels having bandwidths of 40 MHz, 80 MHz or 160 MHz by bonding together two or more 20 MHz channels. For example, IEEE 802.11n described the use of 2 channels (for a combined 40 MHz bandwidth) and defined a High Throughput (HT) transmission format. IEEE 802.11ac described the use of 8 channels (for a combined 160 MHz bandwidth) and defined a Very High Throughput (VHT) transmission format. IEEE 802.11ax also supports a combined 160 MHz bandwidth (which is a combination of 8 channels of 20 MHz width each). For brevity, this disclosure includes descriptions of IEEE 802.11ax devices as an example. In IEEE 802.11ax, a transmission format may spread High Efficiency (HE) modulated symbols throughout a combined channel group.

The AP 102 may be an example of a first wireless communication device 110. Regardless of whether the first wireless communication device 110 is an AP or a traditional STA, it may be referred to as a "sending STA" for the examples in this disclosure. The STAs 104 may be examples of the second wireless communication device 120 and may be referred to as a "receiving STA" in the examples in this disclosure. To be clear, the designations of sending STA and receiving STA may be reversed in other examples. The first wireless communication device 110 may send MPDU transmissions 116 to the second wireless communication device 120.

The first wireless communication device 110 (as sending device) may include an A-Control field generation unit 112 and a transmission unit 114. The A-Control field generation unit 112 may implement the A-Control field structure in accordance with aspects of this disclosure. The transmission unit 114 may prepare and communicate the MPDU transmissions 116. The second wireless communication device 120 (as receiving STA) may include A-Control field processing unit 122 and a reception unit 124. The A-Control field processing unit 122 may implement the A-Control field structure in accordance with aspects of this disclosure. In some instances, the first wireless communication device 110 and the second wireless communication device 120 may exchange service discovery frames or other management frames to ascertain whether both devices support the extended A-Control field or particular features of the A-Control field as described herein.

Figure 2A:
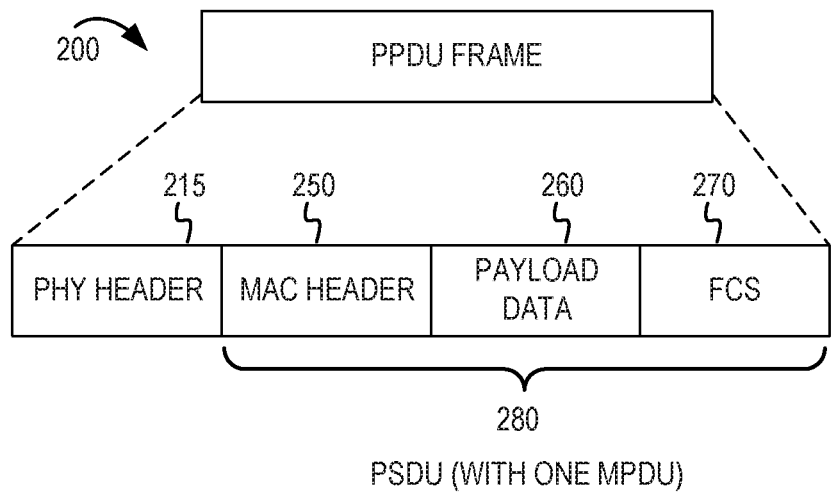
FIG. 2A shows a diagram of an example physical layer convergence procedure (PLCP) protocol data unit (PPDU) frame.

FIG. 2A is a diagram illustrating an example physical layer convergence procedure (PLCP) protocol data unit (PPDU) frame 200. As shown in FIG. 2A, the PPDU frame 200 includes a physical layer (PHY) header 215 and one or more PLCP service data units (such as PSDU 280). Each of the PSDUs may be addressed to a receiver (individually addressed), a group of receivers (group addressed), or to all receivers (broadcast addressed). Similarly, it may be sent by a transmitter, a group of transmitters, or all transmitters, or a combination of both. The PDSU 280 includes zero or more MPDUs. In FIG. 2A, the PSDU 280 includes one MPDU. Each MPDU may include one or more of the following fields: a MAC header field 250, a payload/data field 260, and a frame check sequence (FCS) field 270. The PSDU 280 also may be referred to as a payload portion 280 of the PPDU frame 200. The PHY header 215 may be used to acquire an incoming signal (such as an OFDMA signal), to train and synchronize a demodulator, and may aid in demodulation and delivery of the payload portion 280.

Figure 2B:
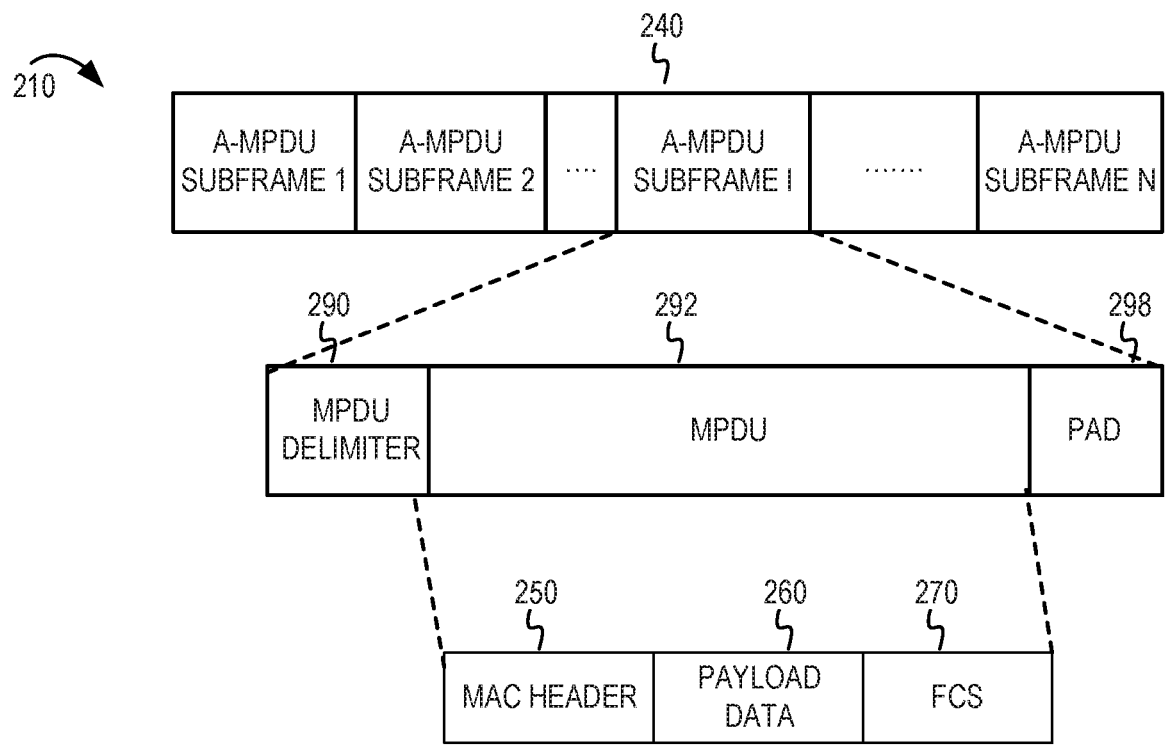
FIG. 2B shows a diagram of an example aggregated media access control (MAC) protocol data unit (A-PPDU) frame.
Figure 13:
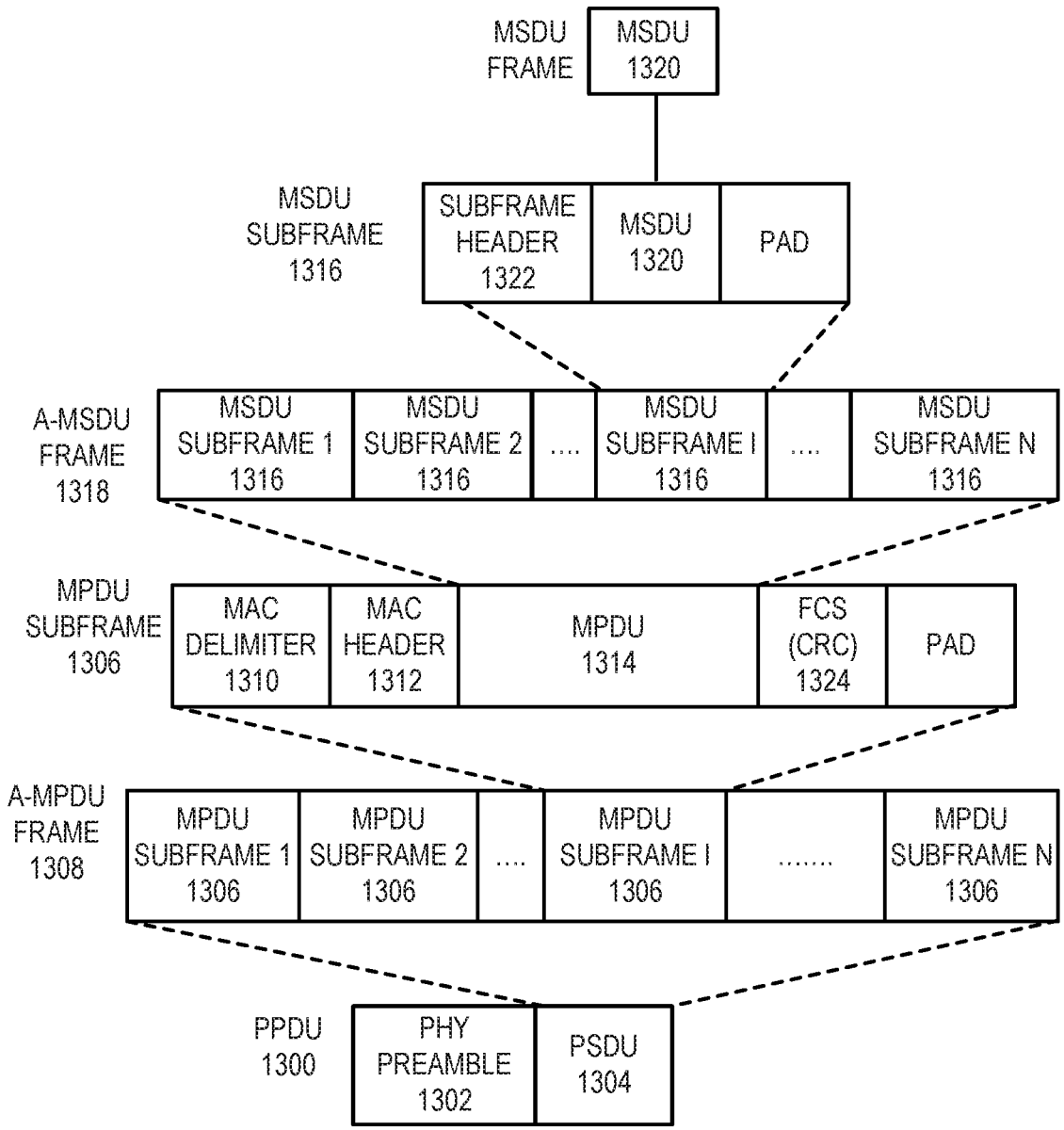
FIG. 13 shows an example physical layer convergence protocol (PLCP) protocol data unit (PPDU) usable for communications between a first device and a second device.

In some implementations, the MPDUs may be included in the PSDU 280 as part of an aggregated MPDU (A-MPDU), as shown in FIGS. 2B and 13.

FIG. 2B shows a diagram of an example aggregated media access control (MAC) protocol data unit (A-PPDU) frame. The PHY header 215 is omitted for brevity. Following the PHY header, a series of MPDU may be organized as A-MPDU subframes. Each A-MPDU subframe (such as A-MPDU subframe 240) may include an MPDU delimiter 290, an MPDU 292, and padding 298. The MPDU 292 may have a similar structure as described with regard to FIG. 2A. For example, the MPDU 292 may include one or more of the following fields: a MAC header field 250, a payload/data field 260, and a frame check sequence (FCS) field 270.

Figure 3:
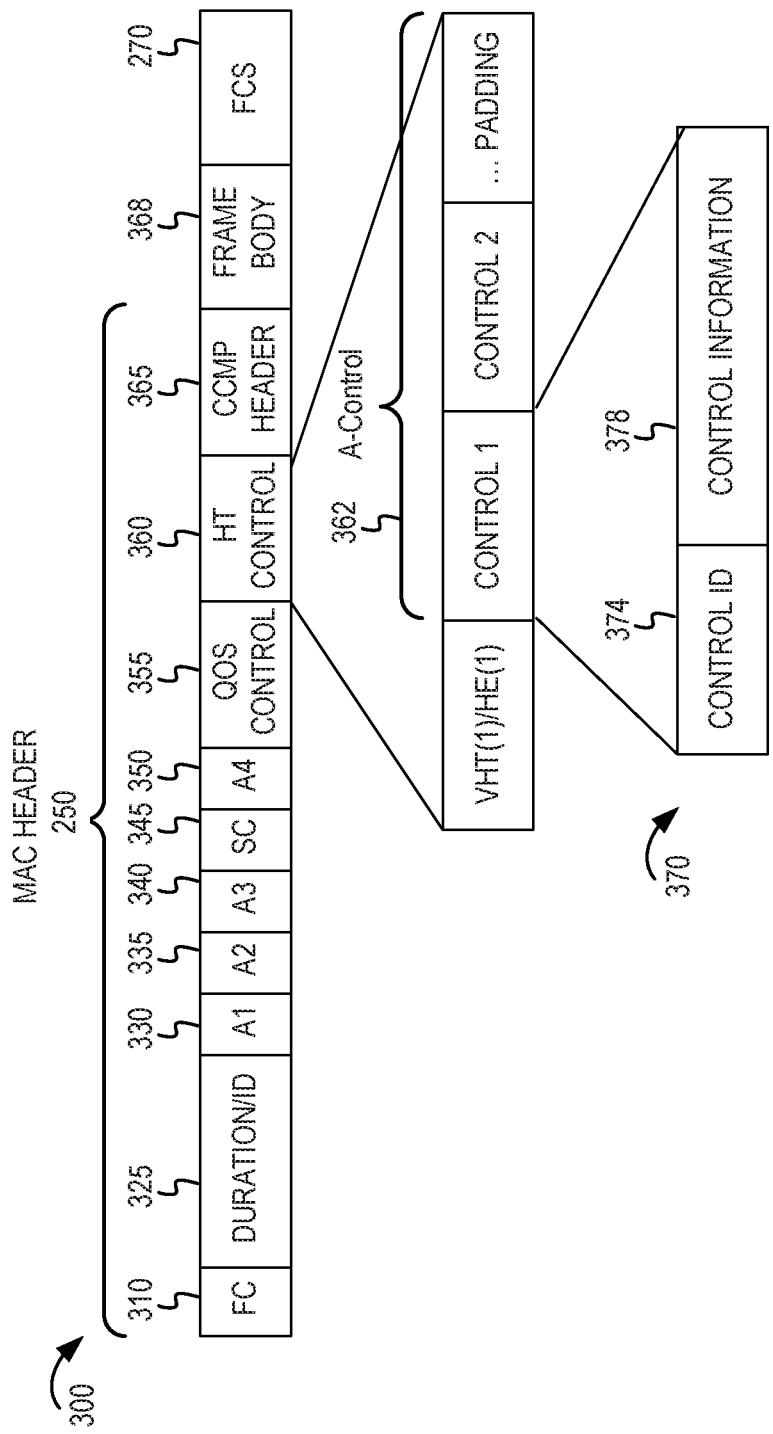
FIG. 3 shows a diagram of an example MAC frame with an Aggregated Control (A-Control) field.

FIG. 3 shows a diagram of an example medium access control (MAC) frame with an Aggregated Control (A-Control) field. In some implementations, the MAC frame 300 may include a media access control protocol data unit (MPDU) frame. In some implementations, the MAC frame 300 may correspond to the payload portion 280, as previously described in FIG. 2. As shown, the MAC frame 300 includes one or more of several different fields: a frame control (FC) field 310, a duration/identification field 325, a receiver address (A1) field 330, a transmitter address (A2) field 335, a destination address (A3) field 340, a sequence control (SC) field 345, a fourth address (A4) field 350, a quality of service (QoS) control (QC) field 355, a high throughput (HT)/very high throughput (VHT) control field 360, a frame body 368, and a frame check sequence (FCS) field 270. Some or all of the fields 310-365 may make up the MAC header 250 of FIG. 2. In some implementations, a protocol version field of the frame control field 310 of the MAC frame 300 can be 0, or 1 or greater than 1.

The A-Control field 362 may be included in a High Throughput (HT) Control field 360. Alternatively, the A-Control field may be included after the HT Control field or immediately after the CCMP Header (in this latter case, the information can be encrypted). Counter Mode Cipher Block Chaining Message Authentication Code Protocol (Counter Mode CBC-MAC Protocol) or CCM mode Protocol (CCMP) is an encryption protocol designed for WLAN devices that implements the standards of the IEEE 802.11i. In the examples of this disclosure, the A-Control field is included in an HT Control field 360. However, other locations for the A-Control field 362 may be possible.

FIG. 3 also shows an A-Control field 362 as a series of control parameters (Control 1, Control 2, and so on). Each control parameter (such as a first control parameter 370) may be identified by a control identifier (ID) 374 that serves as a header the control parameter in a sequence of control parameters. Following the Control ID 374, the control information 378 may have a different length depending on the control ID 374 value. Table 1 shows an example of various Control IDs and the information associated with each.

TABLE 1

| Control ID | Meaning | Length of Control Information (bits) |
|---|---|---|
| 0 | Triggered response scheduling (TRS) | 26 |
| 1 | Operation Mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7-14 | Reserved | |
| 15 | ONES | 26 |

In legacy systems, the length of the A-Control field was limited to 30 bits. The container (such as the HT Control field) of the A-Control field may have a total length of 32 bits, which includes 2 leading indicators, and 30 bits for control parameters. However, the limited size of the A-Control field constrains the quantity of control parameters that may be included. For example, the A-Control field may have been constrained to only one or two control parameters depending on which control parameters were included.

In accordance with this disclosure, the A-Control field may have a longer length and may be variable in size to accommodate more control parameters. In the descriptions below, the length of the A-Control field may be described in a control header of the A-Control field. The control header may indicate a length of the container (such as the HT-Control field) of the A-Control field, or of the A-Control field itself. Because the length of the A-Control field and the HT-Control field are related, in this disclosure, references to the length of the A-Control field may be used interchangeably with reference to the length of the container (such as the HT-Control field) carrying the A-Control field. In some implementations, to indicate the length of the A-Control field, one of the control parameters may be repurposed to include the length value as control information. For example, a specific value for the control ID that is currently reserved, at least in part, may be used to indicate the length of the A-control field or to provide delimiters for multiple control parameters. In the implementations below, we describe the case where the Control ID value is equal to 15. Although the examples in this disclosure use the ONES value (control ID 15), it is also possible to use one of the reserved values (control ID 7 to 14) to indicate the length of the A-Control Field or the presence of another field following the Control ID field that indicates the length of the A-Control field. In some implementations, the length may indicate the length of the remaining portion of the A-Control field, or of a sub-portion of the A-Control field as described in more detail in some of the examples below. In some implementations, the length of the A-Control field may be negotiated beforehand. For example, a wireless communication device may negotiate a length (or size limit) for the A-Control field when it creates a wireless association with another wireless communication device.

Figure 4:
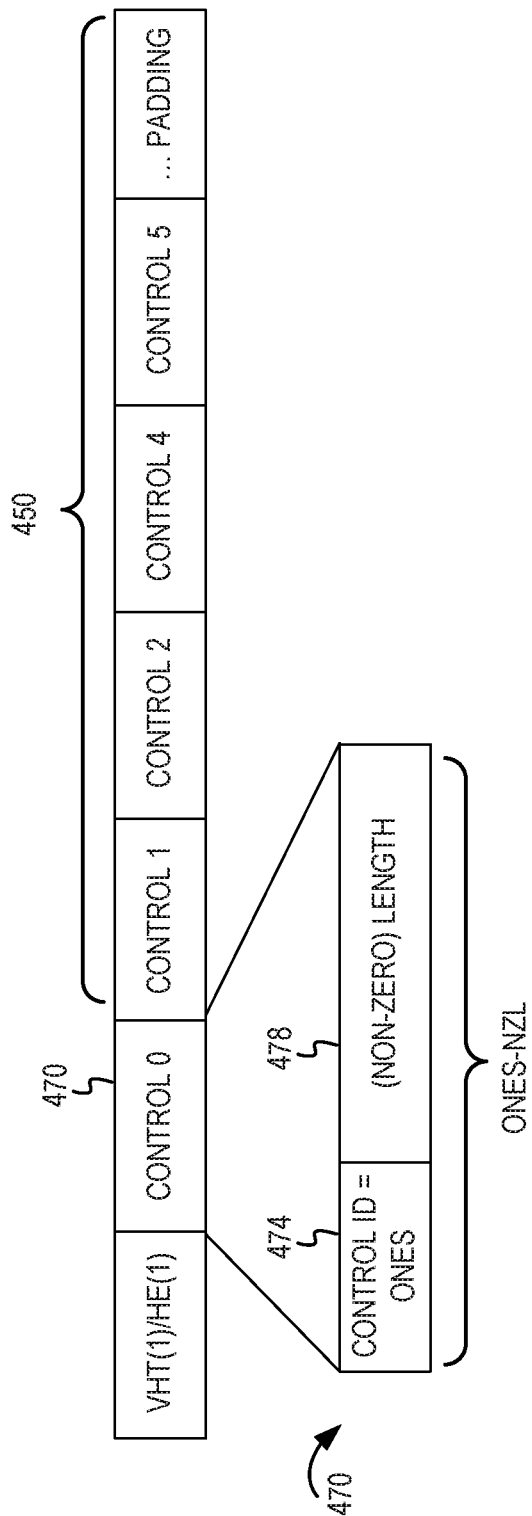
FIG. 4 shows an example of using a first portion to indicate the length of a field that has aggregated control information.

FIG. 4 shows an example of using a first portion to indicate the length of a field that has aggregated control information. For example, the first portion may indicate a length of the A-Control field or of the container (such as an HT Control field) that includes the A-Control field. In some implementations, the length value may include a header (the VHT/HE bits) and the first portion (Control 0) as well as the remaining control parameters in the A-Control field. In some other implementations, the length value may only include the size of the remaining control parameters in the A-Control field. For example, the first control parameter 470 (control 0) may be used to indicate a length of the remaining portion 450 of the A-Control field. As described previously, the first control parameter may have a ONES value (control ID=15) followed by a non-zero length 478 value. The non-zero length 478 may indicate the length of the remaining portion 450 based on a quantity of octets (or groups of octets). Together, the control ID 474 and the non-zero length 478 may be referred to as a ONES-NZL delimiter in this disclosure. The ONES-NZL delimiter may be used to signal the length of the A-Control field. Although the examples in this disclosure refer to the ONES-NZL type of delimiter, other types of delimiters or control values may be used in other examples.

Figure 5A:
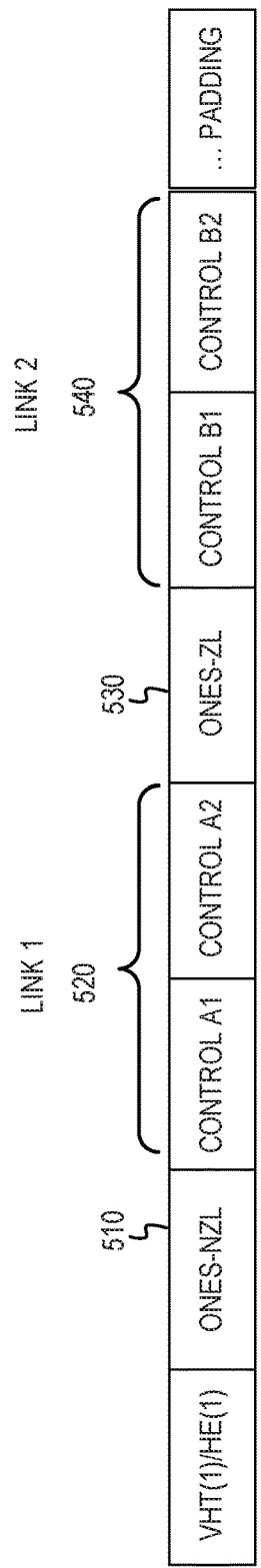
FIG. 5A shows a first example of an A-Control field that includes control parameters for multiple wireless links.
Figure 5B:
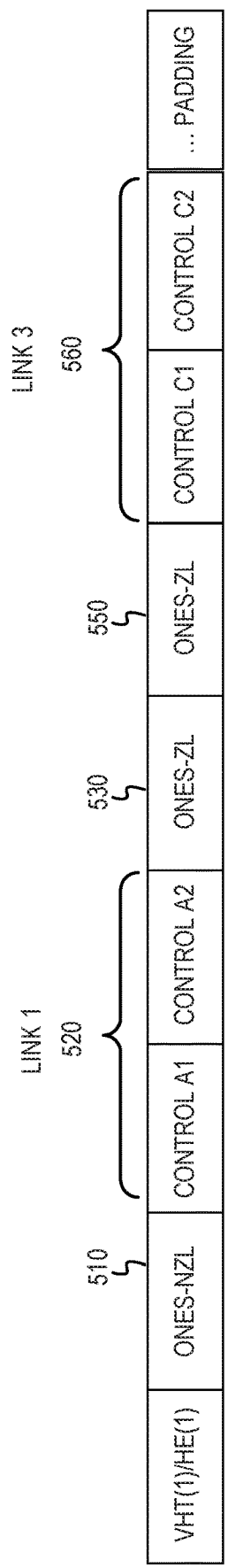
FIG. 5B shows a second example of an A-Control field that includes control parameters for multiple wireless links.

FIGS. 5A and 5B show various options of an A-Control field that includes control parameters for multiple wireless links. In FIG. 5A, each wireless link has separate control parameters. A first portion of the A-Control field is the ONES-NZL 510 that indicates the overall length of the A-Control field. The ONES-NZL 510 field may be followed by control parameters 520 for a first wireless link 1 (such as control parameters A1 and A2). Then delimiters (the ONES-ZL field 530) may signal that the control parameters for the first wireless link are complete, and the next control parameters are for the next wireless link 2. The control parameters 540 for wireless link 2 (control parameters B1 and B2) may follow the ONES-ZL field 530).

As shown in FIG. 5B, if one of the links (such as link 2) does not have control parameters that need to be sent, the ONES-ZL field 530 may be followed by another ONES-ZL field 550 to begin the next link (link 3) section of control parameters 560 (with control parameters C1 and C2).

FIG. 6 shows an example of explicit indicators for multi-link aggregated control parameters. For example, each control parameter may have an explicit indicator (such as a link identifier, Link ID 676) included in a control parameter 670. The Link ID 676 may be included between the control ID 674 and the control information 678. In some implementations, the Link ID 676 may be included in the control IDs that are used as delimiters (such as the ONES-NZL and ONES-ZL examples in this disclosure).

FIG. 7 shows another example of an A-Control field with control parameters for multiple links. In FIG. 7, each wireless link has separate control parameters. A first portion of the A-Control field is the ONES-NZL 710 that indicates the overall length of the A-Control field. The ONES-NZL 710 field may be followed by control parameters 720 for a first wireless link 1 (such as control parameters A1 and A2). Then another delimiter (the ONES-NZL field 730) may signal that the control parameters for the first wireless link are complete and the next control parameters are for the next wireless link 2. The control parameters 740 for wireless link 2 (control parameters B1 and B2) may follow the ONES-NZL field 730). A ONES-EOF field 780 may be used to signal the end of the A-Control field that has control parameters for multiple links. For example, the ONES-EOF may include an all-ONES (control ID=15) followed by an all-ones length value.

FIG. 8 shows an example of an A-Control field with control parameters for multiple links without using delimiters. For example, if each control parameters include an explicit link ID (as shown in FIG. 6), then the delimiters may be omitted. Alternatively, the order and occurrence of control parameters may implicitly indicate that they are for different links. For example, an A-Control field for a single link would not include more than one control parameter with the same Control ID. Therefore, if the same control ID is present in the A-Control field, the second occurrence of the control ID may implicitly signal the change to the next link. Using the example in FIG. 8, a first set of control parameters 820 is related to a first wireless link 1 and a second set of control parameters 840 may be related to a second wireless link 2. The control parameter A1 may have the same control ID as the control parameter B1. When the recipient processes the A-Control field and detects control parameter B1 having the same control ID as control parameter A1, the recipient may determine that the control parameter B1 may be related to the second wireless link.

As described above with regard to FIGS. 5A, 5B, 6, 7, and 8, there may be several ways to include control parameters for multiple links. These techniques, or variations thereof, may be useful to enable and disable different links. For example, an OM control parameter may set particular bits (such as the UL MU Disable or the UL MU Data Disable bits) to a first value (such as 1) to indicate disablement of that link. In some implementations, a new control ID (such as one of the reserved values) may be defined to contain information related to link disablement. For example, the control parameter may include a target switch time of the state (enabled or disabled) change. In some implementations, the enablement and disablement may be used to force a recipient to move from a first wireless link to a second wireless link. For example, a first wireless link may be indicated to be disabled at a target switch time, while a second wireless link may be indicated to be enabled at the target switch time.

In some implementations, the time value may be relative based on a start or end time of the frame that carries the control parameters. For example, the time value may be a time offset relative to the frame. In some implementations, the timing information may include a timestamp or other time that is based on synchronized time. A timing synchronization function (TSF) timer may be maintained in both the sending device and the receiving device. The timing information for link enablement or link disablement may be a full or partial timestamp based on the TSF timer. In some implementations, the sending device and receiving device may maintain separate TSF timers for the first link and the second link. The timing information for enablement or disablement may be specific to the TSF timer for a particular link.

Figure 9:
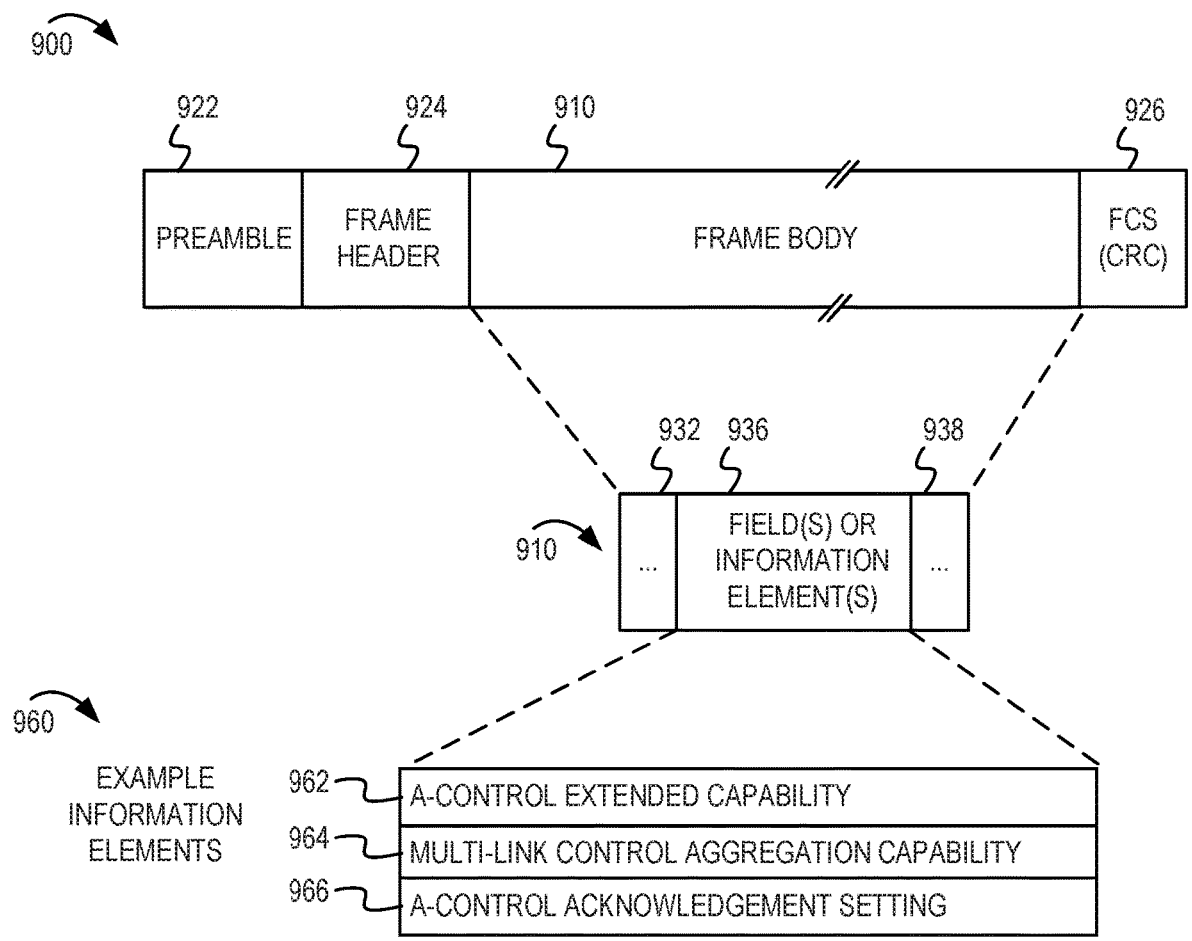
FIG. 9 depicts a conceptual diagram of an example configuration message for use in a WLAN.

FIG. 9 depicts a conceptual diagram of an example configuration message for use in a WLAN. For example, the example message 900 may be sent from a first communication device to a second communication device, or vice versa. The example message 900 may include a preamble 922, a header 924, a payload 910, and a frame check sequence (FCS) 926. The preamble 922 may include one or more bits to establish synchronization. The preamble 922 may be used, for example, when a dedicated discovery channel uses a listen-before-talk, contention-based access, or carrier sense access. In some implementations, if the dedicated discovery channel uses a scheduled timeslot for transmission, the preamble 922 may be omitted. The header 924 may include source and destination network addresses (such as the network address of the sending AP and receiving AP, respectively), the length of data frame, or other frame control information. In some implementations, the header 924 also may indicate a technology type associated with a technology-specific payload (if the payload 910 is specific to a particular technology type or types). The payload 910 may be used to convey the configuration information. The configuration information may be organized or formatted in a variety of ways. The payload 910 may be organized with a message format and may include information elements 932, 936, and 938. Several examples of information elements are illustrated in FIG. 9.

Example information elements 960 may be sent as part of a configuration or setup message. The example information elements 960 may include an A-Control extended capability field 962, a multi-link control aggregation capability field 964, an A-Control acknowledgment setting field 966, or any combination thereof.

Figure 10:
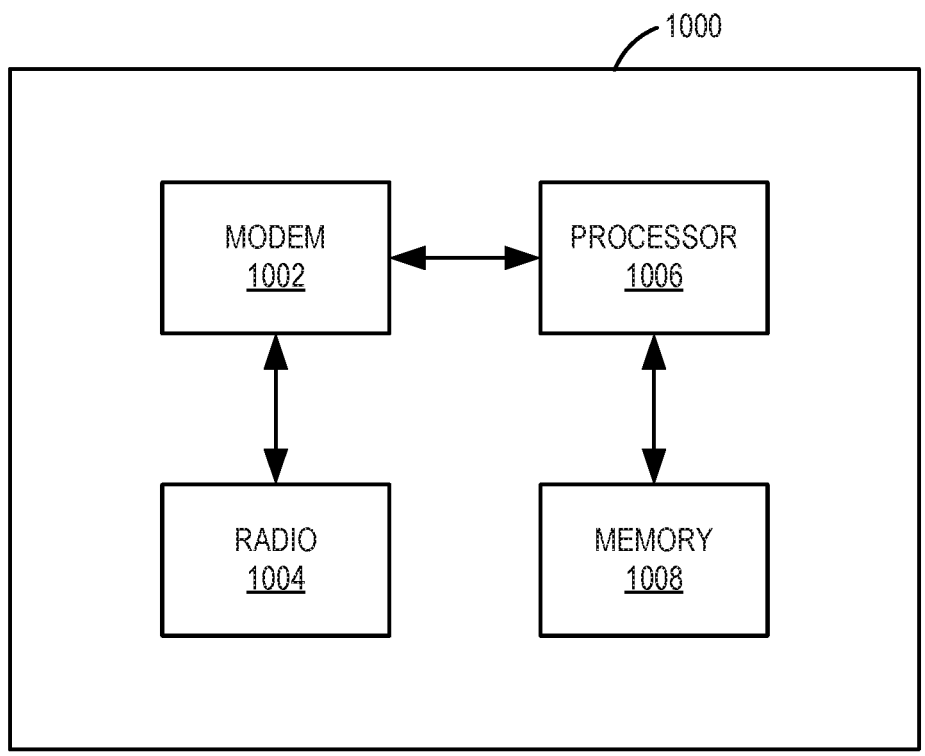
FIG. 10 shows a block diagram of an example wireless communication device.

FIG. 10 shows a block diagram of an example wireless communication device 1000. In some implementations, the wireless communication device 1000 can be an example of a device for use in a STA, such as one of the STAs 104 described above with reference to FIG. 1. In some implementations, the wireless communication device 1000 can be an example of a device for use in an AP such as AP 102 described above with reference to FIG. 1. The wireless communication device 1000 is capable of outputting and receiving wireless communications (for example, in the form of wireless packets). For example, the wireless communication device can be configured to output and receive packets in the form of physical layer convergence protocol (PLCP) protocol data units (PPDUs) and Media Access Control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 1000 can be or can include a chip, system on chip (SoC), chipset, package or device that includes one or more modems 1002, for example, a Wi-Fi (IEEE 802.11 compliant) modem. In some implementations, the one or more modems 1002 (collectively "the modem 1002") additionally include a WWAN modem (for example, a 3GPP 4G LTE or 5G compliant modem). In some implementations, the wireless communication device 1000 also includes one or more radios 1004 (collectively "the radio 1004"). In some implementations, the wireless communication device 1000 further includes one or more processors, processing blocks or processing elements 1006 (collectively "the processor 1006") and one or more memory blocks or elements 1008 (collectively "the memory 1008").

The modem 1002 can include an intelligent hardware block or device such as, for example, an application-specific integrated circuit (ASIC) among other possibilities. The modem 1002 may be configured to implement a PHY layer. For example, the modem 1002 is configured to modulate packets and to provide the modulated packets to the radio 1004 for transmission over the wireless medium. The modem 1002 is similarly configured to obtain modulated packets received by radio 1004 and to demodulate the packets to provide demodulated packets. In addition to a modulator and a demodulator, the modem 1002 may further include digital signal processing (DSP) circuitry, automatic gain control (AGC), a coder, a decoder, a multiplexer, and a demultiplexer. For example, while in a transmission mode, data obtained from the processor 1006 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 1004. In implementations involving beamforming, the modulated symbols in the respective spatial streams are precoded via a steering matrix prior to their provision to the IFFT block.

While in a reception mode, digital signals received from the radio 1004 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from the spatial streams are then fed to the demultiplexer for demultiplexing. The demultiplexed bits may then be descrambled and provided to the MAC layer (the processor 1006) for processing, evaluation, or interpretation.

The radio 1004 includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers are in turn coupled to one or more antennas. For example, in some implementations, the wireless communication device 1000 can include or be coupled with multiple transmit antennas (each with a corresponding transmit chain) and multiple receive antennas (each with a corresponding receive chain). The symbols output from the modem 1002 are provided to the radio 1004, which then transmits the symbols via the coupled antennas. Similarly, symbols received via the antennas are obtained by the radio 1004, which then provides the symbols to the modem 1002.

The processor 1006 can include an intelligent hardware block or device such as, for example, a processing core, a processing block, a central processing unit (CPU), a microcontroller, an application-specific integrated circuit (ASIC), or a programmable logic device (PLD) such as a field-programmable gate array (FPGA), among other possibilities. The processor 1006 processes information received through the radio 1004 and the modem 1002, and processes information to be output through the modem 1002 and the radio 1004 for transmission through the wireless medium. For example, the processor 1006 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 1006 may control the modem 1002 to cause the modem to perform various operations described above.

The memory 1008 can include random access memory (RAM) and read-only memory (ROM). The memory 1008 also can store processor- or computer-executable software (SW) code containing instructions that, when executed by the processor 1006, cause the processor to perform various operations described herein for wireless communication, including the generation, transmission, reception and interpretation of MPDUs, frames or packets.

Figure 11B:
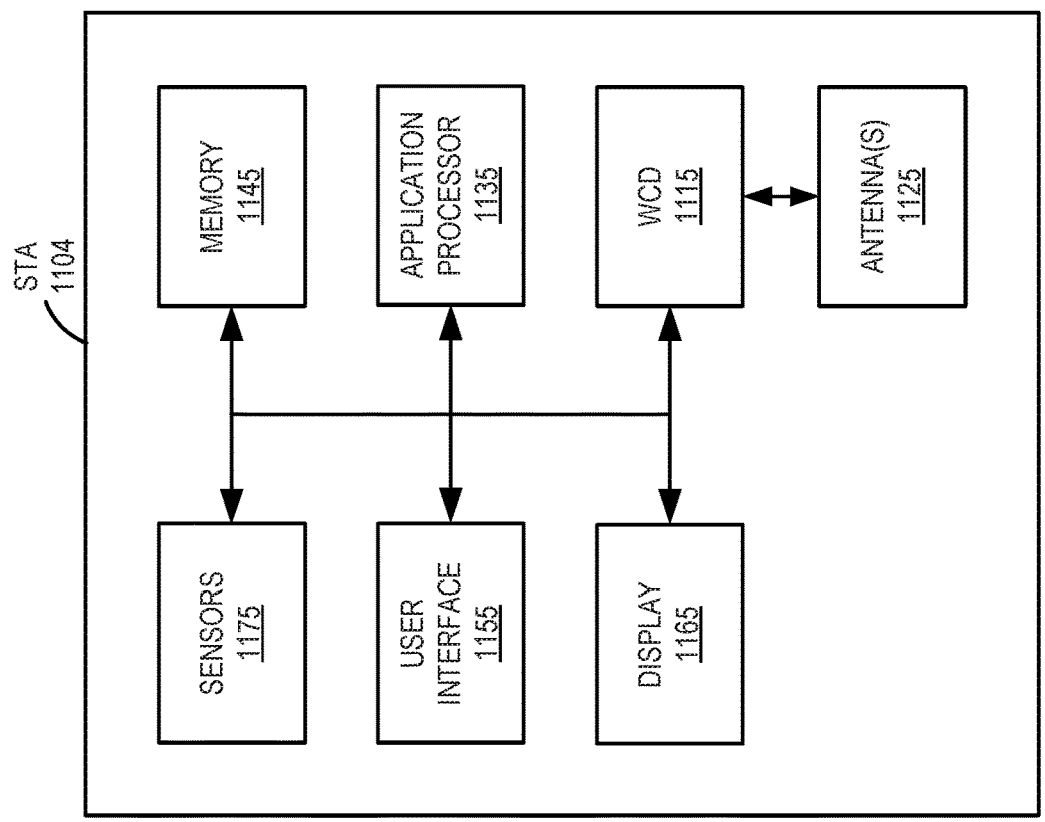
FIG. 11B shows a block diagram of an example STA.
Figure 11A:
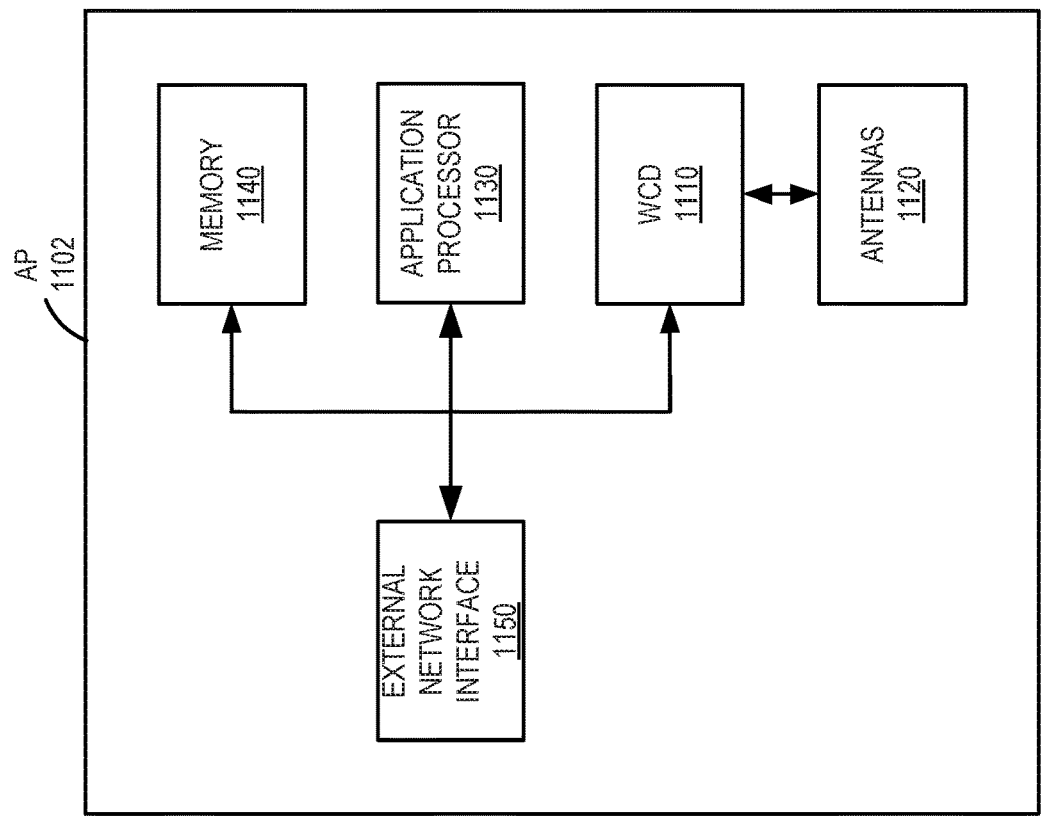
FIG. 11A shows a block diagram of an example AP.

FIG. 11A shows a block diagram of an example AP 1102. For example, the AP 1102 can be an example implementation of the AP 102 described with reference to FIG. 1. The AP 1102 includes a wireless communication device (WCD) 1110. For example, the wireless communication device 1110 may be an example implementation of the wireless communication device 1110 described with reference to FIG. 10. The AP 1102 also includes multiple antennas 1120 coupled with the wireless communication device 1110 to transmit and receive wireless communications. In some implementations, the AP 1102 additionally includes an application processor 1130 coupled with the wireless communication device 1110 and a memory 1140 coupled with the application processor 1130. The AP 1102 further includes at least one external network interface 1150 that enables the AP 1102 to communicate with a core network or backhaul network to gain access to external networks including the Internet. For example, the external network interface 1150 may include one or both of a wired (for example, Ethernet) network interface and a wireless network interface (such as a WWAN interface). One or more of the aforementioned components can communicate with other ones of the components directly or indirectly, over at least one bus.

FIG. 11B shows a block diagram of an example STA 1104. For example, the STA 1104 can be an example implementation of the STA 104 described with reference to FIG. 1. The STA 1104 includes a wireless communication device 1115. For example, the wireless communication device 1115 may be an example implementation of the wireless communication device 1000 described with reference to FIG. 10. The STA 1104 also includes one or more antennas 1125 coupled with the wireless communication device 1115 to transmit and receive wireless communications. The STA 1104 additionally includes an application processor 1135 coupled with the wireless communication device 1115, and a memory 1145 coupled with the application processor 1135. In some implementations, the STA 1104 further includes a user interface (UI) 1155 (such as a touchscreen or keypad) and a display 1165, which may be integrated with the UI 1155 to form a touchscreen display. In some implementations, the STA 1104 may further include one or more sensors 1175 such as, for example, one or more inertial sensors, accelerometers, temperature sensors, pressure sensors, or altitude sensors. One or more of the aforementioned components can communicate with other ones of the components directly or indirectly, over at least one bus.

Figure 12:
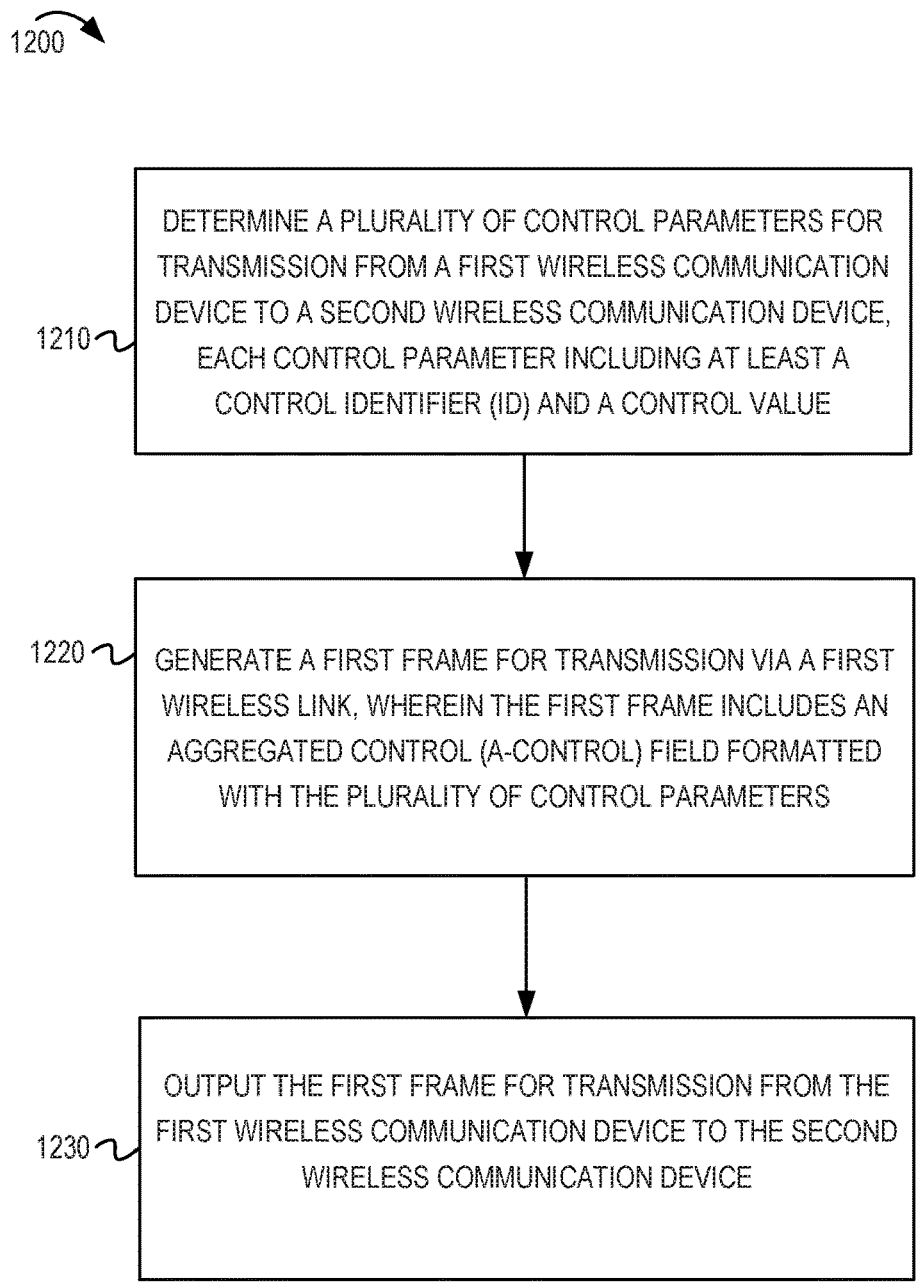
FIG. 12 depicts a flowchart with example operations for a STA to send aggregated control information.

FIG. 12 depicts a flowchart with example operations for a STA to send aggregated control information. The example operations may be performed by a first wireless communication device. The flowchart 1200 begins at block 1210.

At block 1210, the method may include determining a plurality of control parameters for transmission from a first wireless communication device to a second wireless communication device. Each control parameter may include at least a Control identifier (ID) and a control value.

At block 1220, the method may include generating a first frame for transmission via a first wireless link. The first frame may include an aggregated control (A-Control) field formatted with the plurality of control parameters.

At block 1230, the method may include outputting the first frame for transmission from the first wireless communication device to the second wireless communication device.

FIG. 13 shows an example PPDU 1300 usable for communications between a first device and a second device. For example, the PPDU 1300 may be used for a communication from an AP 102 to a STA 104, or vice versa. In some implementations, the A-control field may be in an aggregated A-MPDU subframe. FIG. 13 describes the basic organization of an A-MPDU transmission and the options for A-Control field in one or more of the MPDUs. Each PPDU 1300 includes a PHY preamble 1302 and optionally one or more PSDUs (such as PSDU 1304). Each of the PSDUs may be addressed to a receiver (individually addressed), a group of receivers (group addressed), or to all receivers (broadcast addressed). Similarly, each PDSU may be sent by a transmitter, a group of transmitters, or all transmitters, or a combination of both. Each PSDU 1304 may carry one or more MAC protocol data units (MPDUs) 1306. For example, each PSDU 1304 may carry an aggregated MPDU (A-MPDU) 1308 that includes an aggregation of zero or more MPDU subframes 1306. Each MPDU subframe 1306 may include a MAC delimiter 1310 and a MAC header 1312 prior to the accompanying MPDU 1314, which may include the data portion ("payload" or "frame body") of the MPDU subframe 1306. The MPDU 1314 may carry one or more MAC service data unit (MSDU) subframes 1316. For example, the MPDU 1314 may carry an aggregated MSDU (A-MSDU) 1318 including multiple MSDU subframes 1316. Each MSDU subframe 1316 contains a corresponding MSDU 1320 preceded by a subframe header 1322.

Referring to the MPDU subframe 1306, the MAC header 1312 may include a number of fields containing information that defines or indicates characteristics or attributes of data encapsulated within the frame body of the MPDU 1314. The MAC header 1312 also includes several fields indicating addresses for the data encapsulated within the frame body of the MPDU 1314. For example, the MAC header 1312 may include a combination of a source address, a transmitter address, a receiver address, or a destination address. The MAC header 1312 may include a frame control field containing control information. The frame control field specifies the frame type, for example, a data frame, a control frame, or a management frame. The MAC header 1312 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each MPDU subframe 1306 also may include a frame check sequence (FCS) field 1324 for error detection. For example, the FCS field 1324 may include a cyclic redundancy check (CRC).

As described above, the A-Control field can be included in an A-MPDU subframe. In some implementations, the A-Control field (which may be referred to as a dynamic A-Control field) may be included in an HT Control field without the need of being contained in an MPDU or within an MPDU that does not contain one or more of the fields of the MAC header described above. By reducing the MAC header (or payload section), the MPDU may have a reduced overhead and may provide more efficient use of wireless resources. An HT Control field or other container that includes a dynamic A-Control field may be referred to as a Dynamic HT Control field. In some implementations, the presence of the Dynamic HT Control field can be signaled by using a Reserved bit in the MPDU delimiter. Alternatively, the length value in an MPDU length field may be a value that is less than a certain threshold. For example, the shortest MPDU frame supported is 14 bytes. Therefore, a length value that is less than 14 bytes may be used to indicate that the MPDU frame is a new type of frame that carries a Dynamic HT Control field.

In some implementations, a new MPDU delimiter may indicate that an A-MPDU subframe has a Dynamic HT Control field with aggregated control information. Currently, A-MPDU subframes are using for the Delimiter Signature field the ASCII value for character "n" to identify an A-MPDU subframe. A different value (other than "n") could be used to indicate an A-MPDU subframe that has a dynamic HT Control field so that receivers can differentiate between an A-MPDU subframe carrying a legacy MPDU or a modified MPDU as described in this implementation. In some implementations, since the MPDU delimiter contains an MPDU length field, the A-Control field may not need the length value (such as the NZL-ONES Control field) to indicate the length of the A-Control field. Instead, the length of the MPDU delimiter may indicate the length of the MPDU, the A-Control field, or container. Reduced signaling also can be used when the length of the MPDU can be obtained from information in the MPDU itself and when the only field that is of variable length is the A-Control field (or of the container that carries it). As an example, the QoS Null frame is identified by the Type/Subtype field of the Frame Control field, and a receiver can determine that the length of the frame is 30 Bytes (assuming the A4 field, HT Control field and Frame Body are not present). But if the length value included in the MPDU delimiter indicates that the MPDU length is 42 Bytes, the recipient can deduce that the remaining 12 bytes are attributed to the A-Control field length.

Since Dynamic HT Control field is not protected anymore from FCS of the MPDU (when not carried in a legacy MPDU), the sending STA may append a CRC (such as 16 bits) to protect the Dynamic HT Control field. Alternatively, the sending STA may use the CRC of the MPDU delimiter to protect the container that carries the Dynamic HT Control field.

Figure 14:
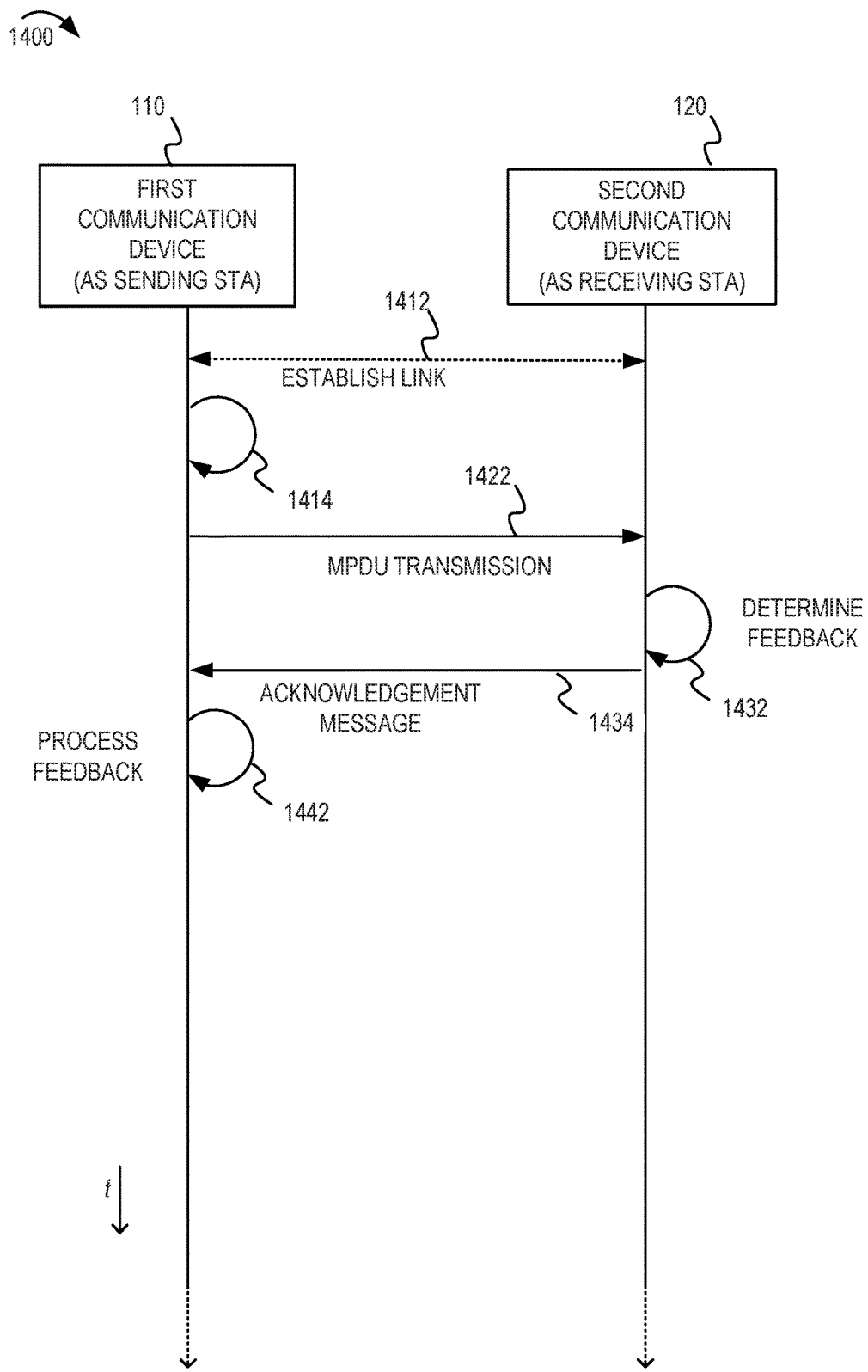
FIG. 14 depicts an example message flow diagram associated with acknowledging an MPDU that includes an A-Control field.

FIG. 14 depicts an example message flow diagram associated with acknowledging an MPDU that includes an A-Control field. The example message flow 1400 shows the first wireless communication device 110 (as the sending STA) and the second wireless communication device 120 (as the receiving STA). The first wireless communication device 110 and the second wireless communication device 120 may exchange configuration messages 1412 (such as the example of FIG. 9) to verify they both support the enhanced A-Control field features of this disclosure.

At process 1414, the first wireless communication device 110 may prepare and send an MPDU that includes an A-Control field as described herein. The MPDU transmission 1422 may include multiple MPDUs (such as an A-MPDU). At process 1432, the second wireless communication device 120 may process the A-Control field. The second wireless communication device 120 may determine to send an acknowledgment message. The acknowledgment message 1434 may include an indicator that indicates whether the second wireless communication device 120 properly processed the A-Control field included in the MPDU transmission 1422. At process 1442, the first wireless communication device 110 may process the acknowledgment message 1434 and determine whether to resend the A-Control field in a subsequent transmission. In some implementations, the acknowledgment message may be a multi-STA Block Ack frame and the indicator that the A-Control field is received correctly may be the inclusion of a field that contains an Ack Type field set to 1 and a TID field set to 13 (which is a value that is not currently used in the technical standards).

Figure 15:
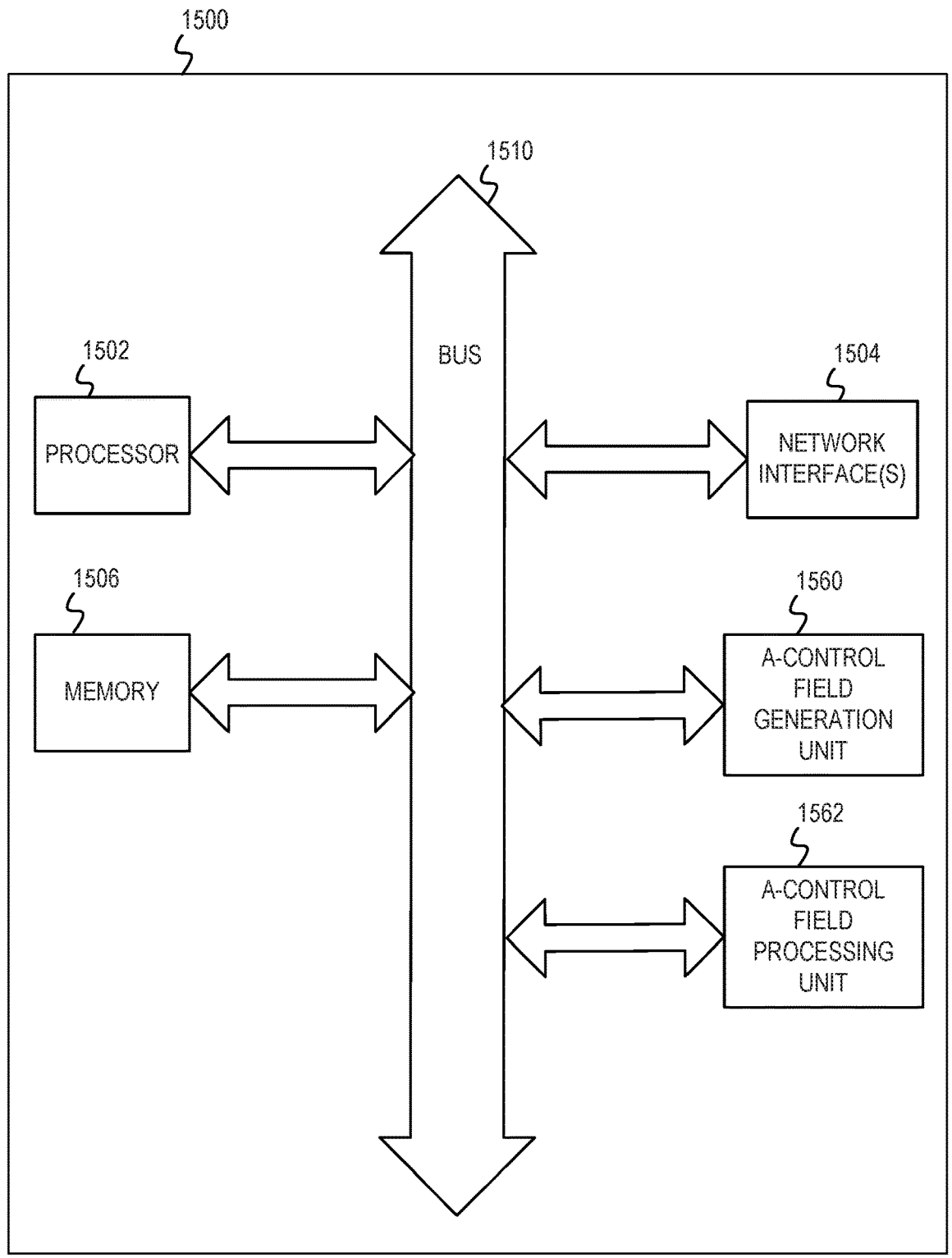
FIG. 15 shows a block diagram of an example electronic device.

FIG. 15 shows a block diagram of an example electronic device. In some implementations, the electronic device 1500 may be one of an access point (including any of the APs described herein), a range extender, or other electronic systems. The electronic device 1500 can include a processor 1502 (possibly including multiple processors, multiple cores, multiple nodes, or implementing multi-threading, etc.). The electronic device 1500 also can include a memory 1506. The memory 1506 may be system memory or any one or more of the possible realizations of computer-readable media described herein. The electronic device 1500 also can include a bus 1510 (such as PCI, ISA, PCI-Express, Hyper-Transport®, InfiniBand®, NuBus,® AHB, AXI, etc.), and a network interface 1504 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1500 may support multiple network interfaces—each of which is configured to couple the electronic device 1500 to a different communication network.

The electronic device 1500 may include an A-Control generation unit 1560 and an A-Control processing unit 1562. In some implementations, the A-Control generation unit 1560 and the A-Control processing unit 1562 may be distributed within the processor 1502, the memory 1506, and the bus 1510. The A-Control generation unit 1560 and the A-Control processing unit 1562 may perform some or all of the operations described herein.

The memory 1506 can include computer instructions executable by the processor 1502 to implement the functionality of the implementations described in FIGS. 1-12. Any of these functionalities may be partially (or entirely) implemented in hardware or on the processor 1502. For example, the functionality may be implemented with an application-specific integrated circuit, in logic implemented in the processor 1502, in a co-processor on a peripheral device or card, etc. Further, realizations may include fewer or additional components not illustrated in FIG. 15 (such as video cards, audio cards, additional network interfaces, peripheral devices, etc.). The processor 1502, the memory 1506, and the network interface 1504 may be coupled to the bus 1510. Although illustrated as being coupled to the bus 1510, the memory 1506 may be coupled to the processor 1502.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module that may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication, comprising:
determining a plurality of control parameters for transmission from a first wireless communication device to a second wireless communication device, each control parameter including at least a Control identifier (ID) and a control value;
generating an aggregated media access control (MAC) protocol data unit (A-MPDU) including a first MAC protocol data unit (MPDU) for transmission via a first wireless link, wherein the first MPDU includes an aggregated control (A-Control) field formatted with the plurality of control parameters, and wherein the A-MPDU includes an MPDU delimiter having an indicator indicating that the first MPDU includes the A-Control field and that the A-Control field is a variable-length A-Control field; and
outputting the A-MPDU including the first MPDU for transmission from the first wireless communication device to the second wireless communication device.

2. The method of claim 1, further comprising:
determining a length of the A-Control field based, at least in part, on the plurality of control parameters; and
populating a first portion of the A-Control field with an indication based on the length.

3. The method of claim 2, wherein the first portion is formatted as a first control parameter, the first control parameter having a reserved value for the Control ID and having the length as the control value for the first control parameter.

4. The method of claim 1, wherein the first MPDU only contains the variable-length A-Control field, wherein the indicator is included in a length field of the MPDU delimiter, and wherein the indicator has a value that is less than a smallest length of an MPDU according to a technical standard, such that the value is reserved to repurpose the length field for indicating the presence of the variable-length A-Control field in the first MPDU.

5. The method of claim 1, wherein the A-Control field is a multi-link control field and includes a first subset of the plurality of control parameters related to the first wireless link and a second subset of plurality of control parameters related to a second wireless link managed by the first wireless communication device.

6. The method of claim 5, further comprising:
generating a second frame for transmission via the second wireless link, wherein the second frame includes a redundant copy of the A-Control field formatted with the plurality of control parameters; and
outputting the second frame for transmission from the first wireless communication device to the second wireless communication device via the second wireless link.

7. The method of claim 5, wherein the plurality of control parameters includes at least one control parameter to enable or disable at least one of the first wireless link or the second wireless link.

8. The method of claim 7, wherein the plurality of control parameters includes timing information related when to enable or disable the first wireless link or the second wireless link, the timing information including either a time offset relative to a start or end of the first MPDU, or a time value based on a synchronized timer.

9. The method of claim 5, wherein the A-Control field includes a delimiter between the first subset of control parameters and the second subset of control parameters.

10. The method of claim 9, wherein the delimiter is formatted as a first control parameter, the first control parameter having a reserved value for the Control ID and having a null control value.

11. The method of claim 1, further comprising:
receiving an acknowledgment from the second wireless communication device, wherein the acknowledgment indicates that the A-Control field was successfully processed by the second wireless communication device, and wherein the acknowledgment is different from a MAC acknowledgment for acknowledging the first MPDU.

12. The method of claim 11, wherein the acknowledgment is included in a reserved bit of a frame control field or block acknowledgment control field.

13. The method of claim 11, wherein the acknowledgement includes signaling to indicate that the acknowledgement is for the plurality of control parameters.

14. The method of claim 13, wherein the acknowledgment is included in a multi-station block acknowledgment (multi-STA Block Ack) message.

15. The method of claim 14, wherein the signaling includes predefined values for an acknowledgement type field and a traffic identifier field of the multi-STA Block Ack message.

16. The method of claim 1, wherein the first MPDU includes the A-Control field in a payload portion of a null packet, a quality-of service (QoS) Null frame, or a null data packet (NDP).

17. An apparatus, comprising:
at least one processor:
at least one memory communicatively coupled with the at least one processor and storing processor-readable code, the at least one processor configured to execute the processor-readable code and cause the apparatus to:
determine a plurality of control parameters for transmission to a first wireless communication device, each control parameter including at least a Control identifier (ID) and a control value; and
generate an aggregated media access control (MAC) protocol data unit (A-MPDU) including a first MAC protocol data unit (MPDU), wherein the first MPDU includes an aggregated control (A-Control) field formatted with the plurality of control parameters, and wherein the A-MPDU includes an MPDU delimiter having an indicator indicating that the first MPDU includes the A-Control field and that the A-Control field is a variable-length A-Control field; and
an interface configured to:
output the A-MPDU including the first MPDU for transmission to the first wireless communication device.

18. The apparatus of claim 17, wherein the at least one processor is further configured to execute the processor-readable code and cause the apparatus to:
determine a length of the A-Control field based, at least in part, on the plurality of control parameters; and
populate a first portion of the A-Control field with an indication based on the length.

19. The apparatus of claim 18, wherein the first portion is formatted as a first control parameter, the first control parameter having a reserved value for the Control ID and having the length as the control value for the first control parameter.

20. The apparatus of claim 17, wherein the indicator is included in a length field of the MPDU delimiter, and wherein the indicator has a value that is less than a smallest length of an MPDU according to a technical standard, such that the value is reserved to repurpose the length field for indicating the presence of the variable-length A-Control field.

21. The apparatus of claim 17, wherein the interface is further configured to:
receive an acknowledgment from the first wireless communication device, wherein the acknowledgment indicates that the A-Control field was successfully processed by the first wireless communication device, and wherein the acknowledgment is different from a MAC acknowledgment for acknowledging the first MPDU.

22. The apparatus of claim 17, further comprising:
a transmitter configured to transmit the A-MPDU to the first wireless communication device, wherein the apparatus is configured as a second wireless communication device.

23. A first wireless communication device for use in a wireless local area network comprising:
at least one processor;
at least one memory communicatively coupled with the at least one processor and storing processor-readable code, the at least one processor configured to execute the processor-readable code and cause the first wireless communication device to:
determine a plurality of control parameters for transmission from the first wireless communication device to a second wireless communication device, each control parameter including at least a Control identifier (ID) and a control value, and
generate an aggregated media access control (MAC) protocol data unit (A-MPDU) including a first MAC protocol data unit (MPDU) that includes an aggregated control (A-Control) field formatted with the plurality of control parameters, wherein the A-MPDU includes an MPDU delimiter having an indicator indicating that the first MPDU includes the A-Control field and that the A-Control field is a variable-length A-Control field;
one or more antennas; and
one or more transceivers configured to transmit, via the one or more antennas, the A-MPDU including the first MPDU from the first wireless communication device to the second wireless communication device.

24. An apparatus, comprising:

at least one processor:

at least one memory communicatively coupled with the at least one processor and storing processor-readable code, the at least one processor configured to execute the processor-readable code and cause the apparatus to:

determine a plurality of control parameters for transmission to a first wireless communication device, each control parameter including at least a Control identifier (ID) and a control value; and generate a first frame including an aggregated control (A-Control) field formatted with the plurality of control parameters, wherein the A-Control field is a multi-link control field and includes a first subset of the plurality of control parameters related to a first wireless link and a second subset of plurality of control parameters related to a second wireless link, and wherein the plurality of control parameters includes timing information indicating when to enable or disable the first wireless link or the second wireless link, the timing information including either a time offset relative to a start or end of the first frame, or a time value based on a synchronized timer; and an interface configured to:

output the first frame for transmission to the first wireless communication device.

25. The apparatus of claim 24, further comprising:

a transmitter configured to transmit the first frame to the first wireless communication device, wherein the apparatus is configured as a second wireless communication device.

* * * * *